UNITED STATES PATENT OFFICE.

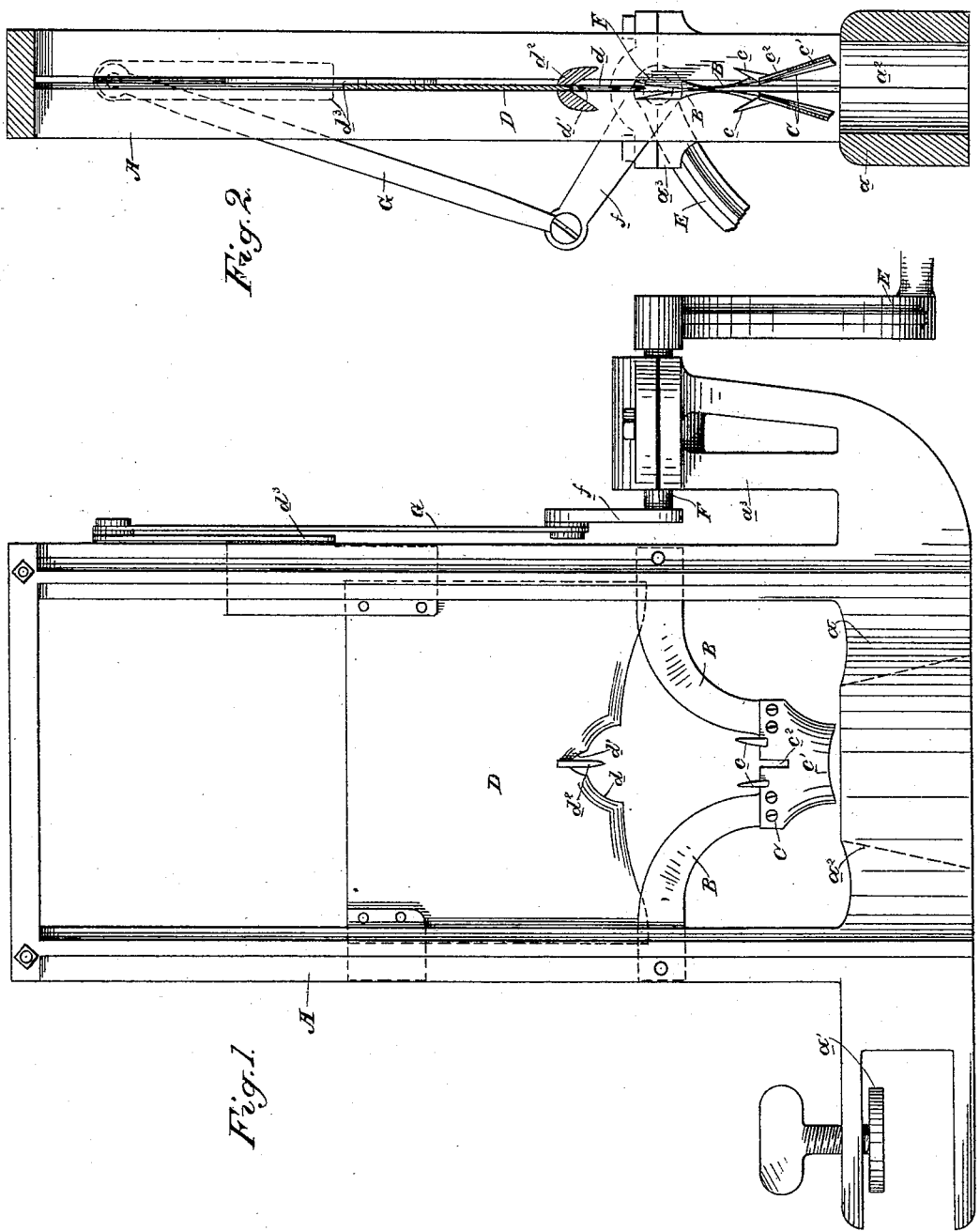

ENOCH W. WEARE, OF SELMA, CALIFORNIA, ASSIGNOR OF TWO-THIRDS TO E. H. TUCKER, OF SAME PLACE, AND S. C. BOLLING, OF ALAMEDA, CALIFORNIA.

FRUIT-PITTER.

SPECIFICATION forming part of Letters Patent No. 495,860, dated April 18, 1893.

Application filed September 9, 1892. Serial No. 445,451. (No model.)

*To all whom it may concern:*

Be it known that I, ENOCH W. WEARE, a citizen of the United States, residing at Selma, Fresno county, State of California, have invented an Improvement in Fruit-Pitters; and I hereby declare the following to be a full, clear, and exact description of the same.

My invention relates to that class of fruit pitters in which a vertically movable knife descends upon the fruit which is supported suitably below it.

My invention consists essentially in the novel construction and arrangement of the separable spring knives with their expansible pit receiver which together form, not only a support for the fruit against the action of the upper knife, but also a cutter for the under side of the fruit, a separator for removing the cut flesh from the pit and a discharger for said pit.

It also consists in the several constructions and combinations of parts hereinafter fully described and specifically pointed out in the claims.

The object of my invention is to provide a simple and effective machine for separating and removing the stones or pits from fruit.

Referring to the accompanying drawings for a more complete explanation of my invention,—Figure 1 is a side elevation of my fruit pitter. Fig. 2 is a vertical section of same.

A is a vertical frame having a base $a$ with suitable attaching devices $a'$ for mounting it upon a table or stand.

B B are the lower knives. There are four of these, arranged in opposing parallel pairs, the members of each pair lying side by side. These knives are curved as shown, their convex sides being upward and reduced to cutting edges. They are of a springy nature, and each pair is secured by the outer end to one of the sides of frame A: thence they curve inwardly and downwardly as shown. The members of a pair are not connected at their inner or lower ends, and they can therefore be separated or forced apart, yielding outwardly and returning again, by reason of their springy character. Between the lower or inner ends of the opposing pairs of knives B is the expansible pit receiver C. This consists of two horizontal and parallel cross bars, one bar being secured at its ends to the lower ends of one member of opposite pairs of knives B and the other being similarly secured to the other members of said pairs. The bars of the receiver can, therefore, separate or move apart from each other, as the knives separate, and close together again with said knives.

The receiver has a flaring entrance $c$ formed by upwardly diverging arms carried by the cross bars. I have here shown two arms carried by each bar. The receiver is formed with downwardly extending divergent tail pieces $c'$. These are concavo-convex, their convex surfaces being outward. These tail pieces lie and swing directly over a discharge aperture $a^2$ in base $a$.

D is the upper knife. This consists of a cross blade mounted in the sides of frame A in suitable manner and adapted to slide up and down therein. The lower edge is sharpened and at its middle it has a recess $d$ with a central indentation $d'$. At this point may be located, when required for particular fruit, the side prongs $d^2$.

The knife D lies in the vertical plane of the space between the members of the pairs of knives B and the opposing halves of the expansible pit receiver, so that said knife D when depressed enters between these parts. In order to receive the side prongs $d^2$ of the upper knife, when such prongs are used, there are vertical slots $c^2$ made in the top of the pit receiver.

The upper knife D has imparted to it a vertically reciprocating movement by means of any suitable transmitting connections, either power or hand. I have here shown a hand crank E operating a shaft F mounted in a suitable side bracket $a^3$ rising from base $a$, said shaft having a crank $f$, with the outer end of which a pitman G is connected, said pitman having connection with an arm $d^3$ of knife D.

The operation is as follows:—The fruit is laid in position upon the lower knives B and pit receiver. Its base rests upon the flaring entrance C and its sides upon the knives B. The upper knife now descends and coming in contact with the fruit forces it downwardly. In thus forcing it, the upper part of the flesh is cut by the upper knife and the lower part is cut by the lower knives, all the knives entering to the pit. The pit itself is forced down in the flaring entrance $c$ of the pit receiver, and under this pressure the receiver expands to provide a passage for the pit, and at the same time the knives B separate, whereby the cut flesh is initially torn from the pit, and then passing over the divergent and separated tail pieces $c'$ of the pit receiver, is fully removed from the pit. The pit drops through the receiver and underlying aperture $a^2$, while the severed flesh drops down outside and both are received in or upon suitably independent receptacles or carriers by which they are separately disposed of.

In certain peaches, notably the Crawfords, the pit is split and tends to separate with the flesh, half clinging to each side. When such peaches are being pitted, the side prongs $d^2$ of the upper knife are used. These come down on each side of the top of the pit and hold its halves together, so that they will not separate and cling to the flesh.

It will be seen that the lower knives, together with the pit receiver, provide for the support of the fruit, the cutting of its lower portion, the reception of the pit and the positive removal of the severed flesh from the pit.

Having thus described my invention, what I claim as new, and desire to secure by Letters Patent, is—

1. In a fruit pitter having a vertically reciprocating upper knife, the opposing laterally separable lower knives arranged in opposing pairs, having convex upper cutting edges curving downwardly toward each other, whereby they receive and support the fruit and expand under the pressure applied to the fruit to permit the pit to pass between them, substantially as herein described.

2. In a fruit pitter having a vertically reciprocating upper knife, opposing pairs of separable lower knives, and an expansible pit receiver between their inner ends having a flaring entrance, substantially as herein described.

3. In a fruit pitter having a vertically reciprocating upper knife, separable lower knives having a pit receiver said receiver having downwardly divergent tail pieces and a flaring entrance, substantially as herein described.

4. A fruit pitter consisting of a frame, an upper knife vertically movable therein, the opposing pairs of separable spring knives B secured to the frame, and the expansible pit receiver carried by the inner ends of the knives B and having the flaring entrance, substantially as herein described.

5. A fruit pitter consisting of a frame, an upper knife vertically movable therein, the opposing pairs of separable spring knives B secured to the frame, and the expansible pit receiver carried by the inner ends of the knives B and having the flaring entrance, and the downwardly divergent tail pieces, substantially as herein described.

6. In a fruit pitter, the combination of the upper reciprocating knife having the recessed center, the separable lower curved spring knives B B, and the intervening expansible pit receiver carried by said lower knives, substantially as herein described.

7. In a fruit pitter, the combination of the upper reciprocating knife having the side prongs, the separable lower curved spring knives B B, and the intervening expansible pit receiver with the vertical slots to receive the side prongs of the upper knife, substantially as herein described.

In witness whereof I have hereunto set my hand.

ENOCH W. WEARE.

Witnesses:
J. B. STURGES,
MILTON McWHORTER.